US008371184B2

(12) United States Patent
Haehner et al.

(10) Patent No.: US 8,371,184 B2
(45) Date of Patent: Feb. 12, 2013

(54) FLOW VELOCITY AND PRESSURE MEASUREMENT USING A VIBRATING CANTILEVER DEVICE

(75) Inventors: Georg Haehner, St. Andrews Fife (GB); Gennady Lubarsky, St. Andrews Fife (GB)

(73) Assignee: The University Court of the University of St. Andrews, St. Andrews (GB)

( * ) Notice: Subject to any disclaimer, the term of this patent is extended or adjusted under 35 U.S.C. 154(b) by 639 days.

(21) Appl. No.: 12/527,346

(22) PCT Filed: Jan. 31, 2008

(86) PCT No.: PCT/GB2008/000314
§ 371 (c)(1),
(2), (4) Date: Dec. 9, 2009

(87) PCT Pub. No.: WO2008/099136
PCT Pub. Date: Aug. 21, 2008

(65) Prior Publication Data
US 2010/0071477 A1      Mar. 25, 2010

(30) Foreign Application Priority Data

Feb. 15, 2007  (GB) .................................. 0702965.5
May 23, 2007  (GB) .................................. 0709880.9

(51) Int. Cl.
| G01H 13/00 | (2006.01) |
| G01H 3/04  | (2006.01) |
| G01Q 60/38 | (2010.01) |
| G01Q 70/02 | (2010.01) |
| G01F 9/00  | (2006.01) |

(52) U.S. Cl. ........ 73/866.5; 73/579; 73/702; 73/861.21; 850/40; 850/53

(58) Field of Classification Search ................... 73/1.16, 73/1.29, 1.57, 1.69, 1.82–1.83, 1.86, 161, 73/170.11, 170.14, 198, 579, 702, 714, 756, 73/861.21, 861.47, 865.9, 866.1, 866.5; 850/14–15, 850/19, 33, 36, 40, 48, 52–53
See application file for complete search history.

(56) References Cited

U.S. PATENT DOCUMENTS
(Continued)

FOREIGN PATENT DOCUMENTS
| EP | 1189016 A1 * | 3/2002 |
| JP | 05333037 A * | 12/1993 |
(Continued)

OTHER PUBLICATIONS

Sadar: "*Calibration of Atomic Force Microscope Cantilevers*", Encyclopedia of Surface and Colloid, 2002, p. 846-856.
(Continued)

*Primary Examiner* — Thomas P Noland

(57) ABSTRACT

Measurement apparatus having a cantilever and a fluid flow channel, the cantilever being positioned in the channel so that it projects in a direction parallel to the direction of fluid flow. In an associated method, the cantilever is positioned in a fluid flow channel such that the cantilever extends parallel with the direction of fluid flow in the channel. Fluid is caused to flow in the channel at a known velocity. The resonant frequency of the cantilever is measured at one or more velocities of fluid flow and calculating the spring constant of the cantilever using the measured resonant frequency or frequencies. If the spring constant of the cantilever is known, the measurement of resonant frequency of the cantilever is used to determine the velocity of the fluid flow.

30 Claims, 3 Drawing Sheets

U.S. PATENT DOCUMENTS

| | | | | |
|---|---|---|---|---|
| 4,096,745 | A | * | 6/1978 | Rivkin et al. ............. 73/861.04 |
| 4,813,289 | A | * | 3/1989 | Lew ......................... 73/861.357 |
| 4,882,935 | A | * | 11/1989 | Lew ......................... 73/861.357 |
| 4,941,361 | A | * | 7/1990 | Lew ............................ 73/861.24 |
| 5,027,662 | A | * | 7/1991 | Titlow et al. ............. 73/861.356 |
| 5,313,832 | A | * | 5/1994 | Stephan et al. ........... 73/204.26 |
| 5,705,814 | A | * | 1/1998 | Young et al. ................ 850/53 X |
| 6,945,100 | B2 | * | 9/2005 | Kwon et al. ............. 73/866.5 X |
| 7,434,445 | B2 | * | 10/2008 | Proksch ......................... 73/1.79 |
| 7,695,951 | B2 | * | 4/2010 | Vafai et al. ................. 435/287.1 |
| 7,774,951 | B2 | * | 8/2010 | Hartmann et al. .............. 33/552 |
| 2002/0092340 | A1 | | 7/2002 | Prater et al. |
| 2002/0162388 | A1 | | 11/2002 | Proksch |
| 2004/0152211 | A1 | * | 8/2004 | Majumdar et al. ........... 436/518 |
| 2005/0225213 | A1 | * | 10/2005 | Richards et al. .............. 310/339 |
| 2006/0075836 | A1 | | 4/2006 | Zribi et al. |
| 2007/0209437 | A1 | * | 9/2007 | Xue et al. ................... 73/514.31 |
| 2008/0289400 | A1 | * | 11/2008 | Quist et al. .................... 73/54.01 |
| 2010/0068697 | A1 | * | 3/2010 | Shih et al. ......................... 435/5 |
| 2010/0210032 | A1 | * | 8/2010 | Shih et al. ..................... 436/501 |

FOREIGN PATENT DOCUMENTS

| | | | |
|---|---|---|---|
| JP | 2005121472 A | * | 5/2005 |
| WO | WO 2008/099136 A8 | * | 8/2008 |

OTHER PUBLICATIONS

International Search Report for corresponding PCT/GB2008/000314 completed Apr. 3, 2008 by H. Boerrigter of the EPO.

* cited by examiner

FLOW VELOCITY AND PRESSURE MEASUREMENT USING A VIBRATING CANTILEVER DEVICE

The present invention relates to the characterisation and use of cantilever devices, in particular cantilevers for use in atomic force microscopy.

BACKGROUND OF THE INVENTION

Cantilevered sensing heads are used in Atomic Force Microscopy (AFM) to sense and measure forces between the sensing head and a surface. This generally involves scanning the sensing head across a surface and measuring its deflection. The deflection of the sensing head may be used to investigate the topography of the surface. It can also be used to measure forces acting on the sensing head such as forces exerted on the tip by the surface, electrostatic forces and capillary forces. In order to measure such forces using this technique, it is necessary to know the spring constant of the cantilevered sensing head. Inaccuracies in determination of the spring constant can lead to unacceptable errors in the resulting force measurement.

The spring constant of cantilevered sensing heads can be measured by a variety of methods including theoretical calculation, applying a known mass to statically deflect the cantilever head, deflecting the cantilevered head with another cantilevered head having a known spring constant and by determination of the resonant frequency either in vacuum or in a static pool of liquid. A summary of prior art calibration methods is given in "Calibration of Atomic Force Microscopy Cantilevers" by J E Sader in "Encyclopaedia of Surface and Colloid Science", published by Marcel Dekker Inc New York [2002] page 846.

These prior art methods have varying problems. For example, where a force is applied using a calibrated weight or another cantilever, the tip of the cantilever may be damaged. This is particularly disadvantageous when a coated cantilevered probe head is used. This applies, for example, to probes having a bio-film coating such as those often used in AFM for biomedical research. Further probe degradation can occur when the probe cannot be calibrated in-situ and has to be moved, calibrated and re-installed.

Another disadvantage of certain known methods is that they are usable only with specific cantilever configurations, such as only for rectangular cantilever heads. Other disadvantages of prior art methods include that they are complicated or difficult to perform or result in inaccuracies due to assumptions made or involve the need to accurately measure other properties such as the mass, volume, profile or density of the cantilever. Further inaccuracies may be introduced by the spring constant being measured in inappropriate medium such as air or a vacuum.

SUMMARY OF THE INVENTION

According to a first aspect of the invention, there is provided a measurement device having a cantilever and a fluid flow channel, the cantilever being positioned in the channel so that it projects in a direction parallel to the direction of fluid flow.

By aligning the cantilever parallel with the direction of flow, any cantilever bending due to contribution of drag force is minimised. In addition, arranging the system in this way permits the cantilever to be sensitive only to the static component of the pressure exerted by the fluid. In consequence, the cantilever is sensitive to the force gradient due to the flow. This configuration allows cantilever calibration to be conducted in high-velocity and/or high-viscosity flows without any risk of damage.

The measurement device may have means for measuring the frequency of vibration of the cantilever. The means for measuring the vibration frequency of the cantilever may be adapted to measure the resonant frequency of the cantilever. The means for measuring the vibration frequency of the cantilever may include a laser adapted to reflect off the cantilever or a piezoelectric element or be a capacitive sensor.

The measurement device may be provided with means of measuring, and/or providing fluid flow at a known, applied pressure and/or pressure drop and/or fluid velocity. The measurement device may be adapted to use that known applied pressure and/or pressure drop and/or fluid velocity in conjunction with at least one measurement of resonant frequency to determine the spring constant of the cantilever. This allows the cantilever to be calibrated without contact between it and a solid weight or other force-applying device. Hence, damage to the cantilever, especially those coated with a bio-film, may be minimised.

The measurement device may be adapted to determine the applied pressure and/or pressure drop and/or velocity of the fluid using at least one measurement of resonant frequency.

The cantilever may be of any shape known in the art but is preferably rectangular and/or v-shaped. The cantilever may extend from a mount. The cantilever may extend to any length but preferably between 10 and 400 μm perpendicularly from the mount.

The channel may be shaped to provide laminar flow. The walls of the channel may be smooth.

The channel may define an opening to receive fluid flow and an opening at which the cantilever meets the mount. The minimal length of the channel between these two openings may correspond to the hydrodynamic entry length L in order to achieve the fully developed velocity profile in the region of cantilever opening. The height of the cavity may be optimized to achieve the maximum of setup sensitivity and depends on the calibration fluid. The width of the channel may depend on the size of the cantilever mount and is variable.

The minimum length L to height h ratio of the channel may be obtained from an expression $L/h = 0.05\,Re$, with $Re$ the Reynolds number. The fluid may be selected and/or the channel adapted such that the Knudsen number is less than 0.01. By providing a channel having a length to height ratio in this range and/or adapted to achieve a Knudsen number of less than 0.01, the fluid flow upon reaching the cantilever is fully developed, predictable and promotes laminar flow.

The cantilever may be integral with a holder or may be removable there from, with the base adapted to receive the mount and cantilever to form the channel. The cantilever may be part of a sensing head for an atomic force microscope. The cantilever may form a cantilever chip for an atomic force microscope.

The holder and/or mount may be substantially rigid such that the channel is substantially rigid.

The measurement device may include a cover, adapted to seal with the holder in order to enclose the mount, cantilever and channel within the holder and cover. The cover may be transparent, preferably glass. In this way, if the means for measuring the vibration frequency of the cantilever is a laser, then it may be located outside the measurement device and the laser beam may pass through the cover.

The channel may have a fluid inlet and a fluid outlet and the cantilever may be positioned so that it projects towards the fluid outlet.

According to a second embodiment of the invention, there is provided a method for determining the spring constant of a cantilever, the method involving positioning the cantilever in a channel adapted to permit fluid flow such that the cantilever extends parallel with the direction of fluid flow in the channel, measuring the resonant frequency of the cantilever at one or more velocities of fluid flow and calculating the spring constant of the cantilever using the measured resonant frequency.

The method may involve providing the fluid at a known applied pressure and/or pressure drop and/or fluid velocity. Alternatively, the method may involve measuring applied pressure and/or pressure drop and/or fluid velocity of the fluid.

The cantilever may be arranged relative to the fluid flow such that the pressure exerted by the fluid on the cantilever is substantially a static pressure.

The length to height ratio of the channel may be greater than 20 and preferably between 20 and 700. The fluid flow may be laminar flow. The fluid flow may be such that the inertial forces exerted by the fluid are negligible. The fluid flow may be such that the Reynolds number (Re) is less than 2000.

The cantilever may be the cantilever of an atomic force microscope. The cantilever may form at least part of a cantilever chip of an atomic force microscope.

According to a third aspect of the present invention is a method for determining the velocity of flow of a fluid and the fluid flow rate, including positioning a cantilever in a channel adapted to permit fluid flow such that the cantilever extends parallel with the direction of fluid flow, measuring the resonant frequency of the cantilever and using the measured resonant frequency to determine the velocity of flow of the fluid.

The method may further include using a cantilever of known spring constant or determining the spring constant of a cantilever.

According to a fourth aspect of the present invention is a holder adapted to receive an atomic force microscope cantilever chip such that the cantilever chip and/or the holder define a channel for fluid flow and wherein the cantilever is in communication with, and extends parallel to, the channel.

The fluid may be a gas or a liquid. The fluid may be nitrogen.

BRIEF DESCRIPTION OF THE DRAWINGS

The present invention will be described by way of example only with reference to the following drawings, of which.

DETAILED DESCRIPTION OF THE DRAWINGS

Figure 1:
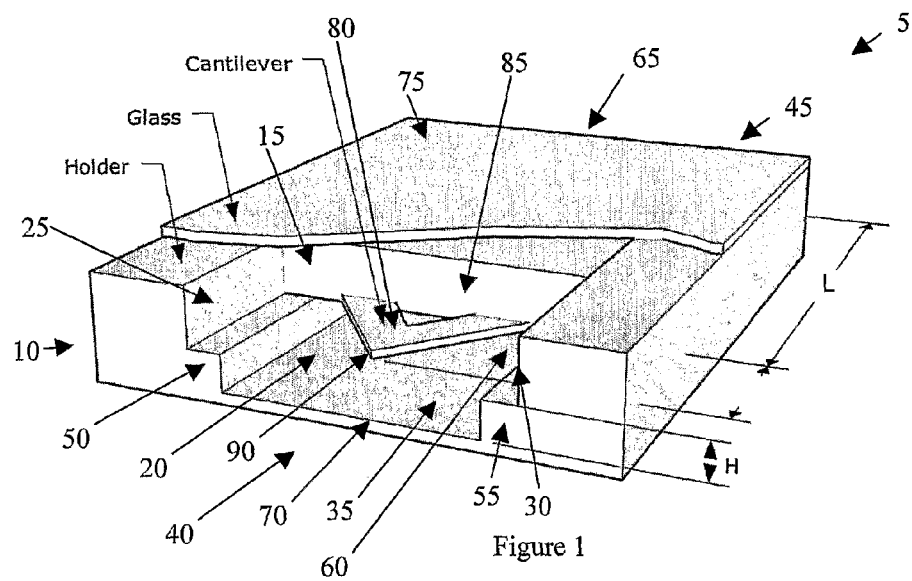
FIG. 1 shows a cantilever measurement device.

FIG. 1 shows a measurement cell 5 having a brass holder 10 shaped to receive a cantilever chip 15. The holder 10 is provided with a slot 20 having side walls 25, 30 and a base 35, running from one side 40 of the holder 10 to the opposing side 45. The sidewalls 25, 30 of the slot 20 each have steps 50, 55 running along the length of the slot 20 adjacent to the base 35.

The steps 50, 55 are such that the cantilever chip 15 may be seated upon them and supported away from the base 35 of the slot in order to define a channel 60 having a flow inlet 65 and outlet 70. The slot 20 is sealed by a glass cover 75, which encloses the cantilever chip 15 within the slot 20.

The cantilever chip 15 has a v-shaped cantilever 80 extending from a chip section 85 such that the apex 90 of the cantilever 80 points away from the chip 85. The angle between the cantilever legs is 62°. The holder 10 is shaped and sized such that the cantilever chip 15 can be placed within the slot 20 of the holder such that the cantilever extends parallel with the channel 60 defined by the chip 85 and the holder 10 and points towards the outlet 70 of the channel 60. The cantilever 80 is formed of gold-coated silicon nitride.

The channel 60 is sized to have a cross section of 1 mm wide and 20 μm high. The chip 85 is sized to give a channel 60 of 3.5 mm+l in length, where l is the length of the cantilever 80. This provides a length to height ratio for the channel of around 180. This high channel length to height ratio ensures that the fluid flow is fully developed by the time that it reaches the cantilever 80. The inlet 65 of the channel 60 is connected to a pressurised nitrogen supply via a valve for adjusting the pressure. Nitrogen provides a cheap, easily accessible fluid having well defined and known parameters. A pressure meter, such as a manometer, is used to measure the pressure drop ($\Delta p$) between the inlet 65 and outlet 70.

An external laser (not shown) may be used to provide a beam through the glass cover, to be reflected from the cantilever 80 and detected by a split photodiode in order to determine the displacement and thereby the frequency of vibration of the cantilever 80. The measurement device 5 is constructed around an atomic force microscope having the scanner disconnected and removed. The resonance peaks of the fundamental mode noise, thermal noise spectra of the cantilever 80 are recorded using a spectrum analyser (not shown).

In order to measure the spring constant of the cantilever 80, the initial resonant frequency of the cantilever 80 is measured with the cell filled by nitrogen gas but with no fluid flow through the channel 60. Nitrogen flow is then introduced into the channel by applying pressure at the inlet 65. The applied pressure is then increased, which increases the velocity of nitrogen flow. The resonant frequency of the cantilever 80 is measured at various controlled nitrogen flows. For example, the resonant frequency is measured at ten different levels of pressure drop ($\Delta p$) up to a maximum of 7 kPa. In order to establish hydrodynamic stability after a pressure change, the cantilever 80 is exposed to each different fluid flow for one minute prior to collecting vibrational frequency data. At an applied pressure of 10 kPa, the system results in a fluid velocity in the channel mid line of 15 ms$^{-1}$. The Reynolds number for this arrangement is about 20. Another important dimensionless parameter that must be taken into account in the design of microfluidic gas systems is the Knudsen number, Kn, which defines the ratio of the mean free path of the gas molecules, $\lambda$, to a characteristic dimension of the channel 60, h, i.e. Kn=$\lambda$/h. When the channel 60 described above is filled with nitrogen gas, the calculated Knudsen number is about 0.003 and hence in the regime referred to as non-slip flow. This combination of the Reynolds and Knudsen numbers corresponds to a laminar regime of incompressible flow.

Without wishing to be bound by any particular theory, if the fluid flow is substantially laminar, the influence of inertial forces as characterised by the Reynolds number (Re) is low, corresponding to a Reynolds number of less than 2000, and the fluid enters the channel with uniform velocity, then the spring constant or the velocity of the fluid may be calculated as follows.

Figure 2:
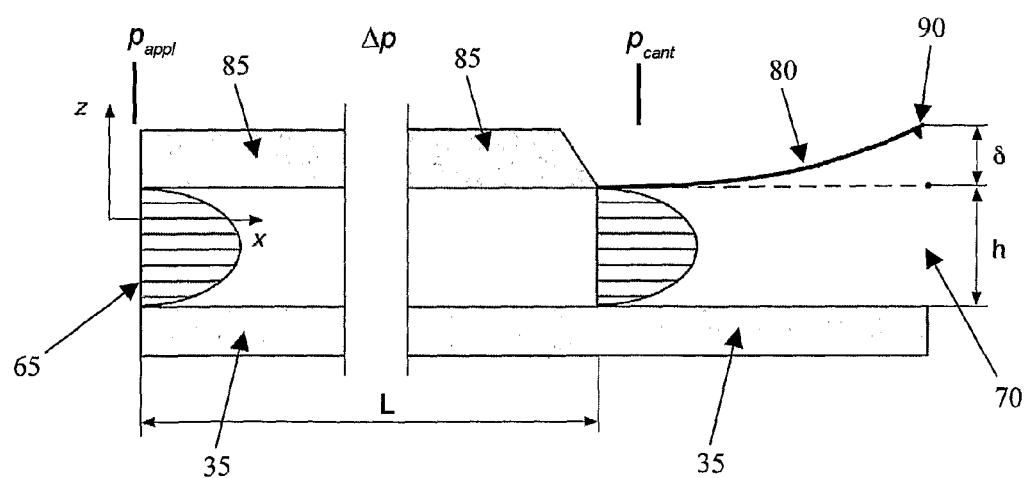
FIG. 2 shows a schematic of the fluid flow through the cantilever measurement device of FIG. 1.

Due to the channel 60 being much longer than it is high, i.e. length/height>10, the fluid flow reaching the cantilever 80 essentially has a velocity profile having a stable parabolic shape, as shown in FIG. 2. This velocity profile in the z-direction corresponds to plane Poiseuille flow. The maximum velocity ($u_0$) of the fluid flow in the centre of the channel 60 depends on the static pressure difference ($\Delta p$) between the pressure applied at the inlet ($p_{appl}$) and the pressure at the cantilever 80 opening ($p_{cant}$), the viscosity of the fluid ($\eta$) and the length (L) and height (h) of the channel 80 such that:

$$u_0 = \frac{h^2 \Delta p}{8 \eta L} \quad (1)$$

As the velocity at the channel walls is zero for laminar flow, $p_{cant}$ can be expressed in terms of the dynamic pressure according to Bernoulli's law:

$$p_{cant} = \frac{1}{2} \rho u_0^2 \quad (2)$$

where $\rho$ is the density of the fluid.

When applied to a flexible cantilever having a surface area A, this pressure ($P_{cant}$) causes the resulting force $F_p = p_{cant} A$. This force is applied to the centre of inertia of the projected area of the cantilever. The deflection $\delta_p$ of the cantilever due to the applied pressure of the parallel fluid flow can be expressed as:

$$\delta_p = \frac{F_p}{k_p} \quad (3)$$

where $k_p$ is the cantilever spring constant corresponding to a uniformly distributed surface load. This spring constant differs significantly from the commonly used spring constant $k_f$, which corresponds to an end-loaded cantilever. For cantilevers with common geometries, the relation between these spring constants can be calculated.

The differential equation of a cantilever beam for a small deflection is given by $$E \frac{d^2 \delta(x)}{dx^2} = \frac{M(x)}{I(x)} \quad (4)$$

where M is the bending moment, E is the Young's modulus, $\delta(x)$ is the deflection along the cantilever, and I is the area moment of the cross section with respect to the neutral axis of the cantilever. The ratio between the two spring constants $k_f$ and $k_p$ of an end-loaded and a uniformly loaded rectangular cantilever, respectively, is relatively easy to find. The static pressure p of the fluid flow can be replaced for a cantilever of constant width, w, by the distributed load $f_p(x) = pw$, and the bending moment for a rectangular cantilever due to the pressure is:

$$M_p(x) = \frac{pwx^2}{2}$$

The area moment of a rectangular cross section cantilever of thickness, t, is given by $$I = \frac{wt^3}{12}$$

Integrating equation (4) twice and using boundary conditions yields the deflection of the end point of a rectangular cantilever:

$$\delta_p = \frac{pwl^4}{8EI} = p \frac{2}{3} \frac{l^4}{t^3 E}$$

With $p = F_p / A$ and $k_p = F_p / \delta_p$, the spring constant of a pressure-loaded rectangular cantilever can be written as:

$$k_p = \frac{2}{3} \frac{At^3 E}{l^4} \quad (5)$$

Substituting expressions for the surface area $A = wl$ and for the spring constant of an end-loaded rectangular cantilever $k_f = (Ewt^3)(4l^3)$ into (5) gives the ratio between the two spring constants as:

$$k_f = \frac{3 k_p}{8}, \text{ for rectangular cantilevers} \quad (6)$$

Figure 3:
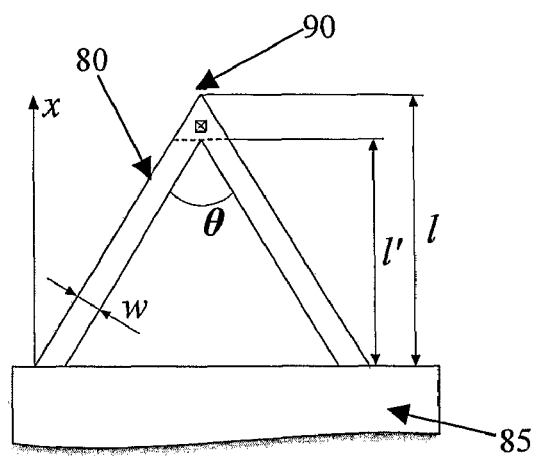
FIG. 3 shows a v-shaped cantilever for use in the cantilever measurement device of FIG. 1.

For V-shaped cantilevers, as shown in FIG. 3, the determination of the ratio between the two spring constants is not such a simple task. However, taking into account the actual position of the AFM tip (and hence of the load) on the cantilever, we use a modified two 'rectangular beams' model as a good approximation to describe the spring constant of end-loaded V-shaped cantilevers. This approach yields the relationship:

$$k_f = \frac{Ewt^3}{2l'^3 \cos \frac{\theta}{2}}$$

where $$l' = l - w / \sin \frac{\theta}{2},$$

E is the Young's Modulus, w is the width of each leg of the cantilever, t is the thickness of the cantilever, $\theta$ is the angle between the legs of the cantilever, l is the perpendicular length of the cantilever to the apex 90 and l' is the perpendicular length to the inside of the apex of the cantilever. For a cantilever with varying width $w(x)$, the static pressure p of the fluid flow can be replaced by the distributed load $f_p(x) = pw(x)$. For a V-shaped cantilever, the bending moment due to the pressure can be written as:

$$M_p(x) = pw\frac{1}{\cos\frac{\theta}{2}}x^2 \quad \text{if } 0 < x \le l'$$

$$= p(l-x)\tan\frac{\theta}{2}x^2 \quad \text{if } l' < x \le l$$

and the area moment of a cantilever of thickness t, is given by $$I(x) = \frac{wt^3}{6}\frac{1}{\cos\frac{\theta}{2}} \quad \text{if } 0 < x \le l'$$

$$= \frac{(l-x)t^3}{6}\tan\frac{\theta}{2} \quad \text{if } l' < x \le l$$

Integrating equation (4) twice using the above boundary conditions yields the deflection of a V-shaped cantilever at the point x=l' when loaded with a uniformly distributed pressure:

$$\delta_p(l') = \frac{3p}{2}\frac{\left(l - w/\sin\frac{\theta}{2}\right)^4}{Et^3}$$

With $p=F_p/A$ and $k_p=F_p/\delta_x$, the spring constant of a pressure-loaded V-shaped cantilever can be written as:

$$k_p = \frac{2}{3}\frac{AEt^3}{\left(l - w/\sin\frac{\theta}{2}\right)^4} \quad (7)$$

Substituting expressions for the surface area, $$A = w\left(2l - w/\sin\frac{\theta}{2}\right)/\cos\frac{\theta}{2},$$

and $k_f$ into (7) gives the ratio between the two spring constants for V-shaped cantilevers as:

$$k_f = \frac{3k_p}{4}\frac{\left(l - w/\sin\frac{\theta}{2}\right)}{\left(2l - w/\sin\frac{\theta}{2}\right)}, \text{ for V-shaped cantilevers} \quad (8)$$

It is evident from (1) and (2) that the pressure value applied to the cantilever is dependent on the channel width h. In the case of an oscillating cantilever, a gradient in the pressure value creates a force gradient $dF_p/dz$ acting on the cantilever in the vibration direction z, causing a shift of the cantilever resonant frequency. The change in the force constant can be easily calculated using the definition of $F_p = p_{cant}A$ in conjunction with (2):

$$\Delta k_p = \frac{dF_p}{dz} = A\rho u\frac{du}{dz} \quad (9)$$

Taking into account that the system is operated in the regime of incompressible flow, i.e., $(h+z) u = h u_0$, then $du/dz$ can be determined as follows:

$$\frac{du(z)}{dz} = -u_0\frac{h}{(h+z)^2} \quad (10)$$

and at the position of the cantilever, where z=0 (if the thermal noise amplitude is much smaller than the channel height):

$$\Delta k_p = -A\rho\frac{u_0^2}{h} \quad (11)$$

A repulsive force (negative force gradient) increases the potential energy of the cantilever and corresponds to an increase in the total cantilever spring constant and, hence, yields a positive change in the resonant frequency, $f_{res}-f_{res,0}=\Delta f>0$, with $f_{res,0}$ being the resonant frequency in the absence of flow (no pressure applied) and $f_{res}$ the resonant frequency with flow (when pressure is applied). Using (1) and (11), and the fact that $$\frac{k_p + |\Delta k_p|}{k_p} = \frac{f_{res}^2}{f_{res,0}^2} = \frac{f_{res,0}^2 + \Delta(f^2)}{f_{res,0}^2},$$

with $\Delta(f^2) = f_{res}^2 - f_{res,0}^2$ the change in the resonant frequency squared, the spring constant $k_p$ can be determined simply by acquiring the resonance frequency shift as a function of the pressure gradient applied to the channel as follows:

$$k_p = -\Delta k_p\frac{f_{res,0}^2}{\Delta(f^2)} = A\rho\frac{u_0^2}{h}\frac{f_{res,0}^2}{\Delta(f^2)} = A\rho\frac{h^3\Delta p^2}{64\eta^2 L^2}\frac{f_{res,0}^2}{\Delta(f^2)} \quad (12)$$

This parallel fluid flow calibration method can be easily applied if the channel geometry is well defined and if using fluids with known physical properties. Equations (6) or (8) can be applied to translate $k_p$ into $k_f$.

Figure 4:
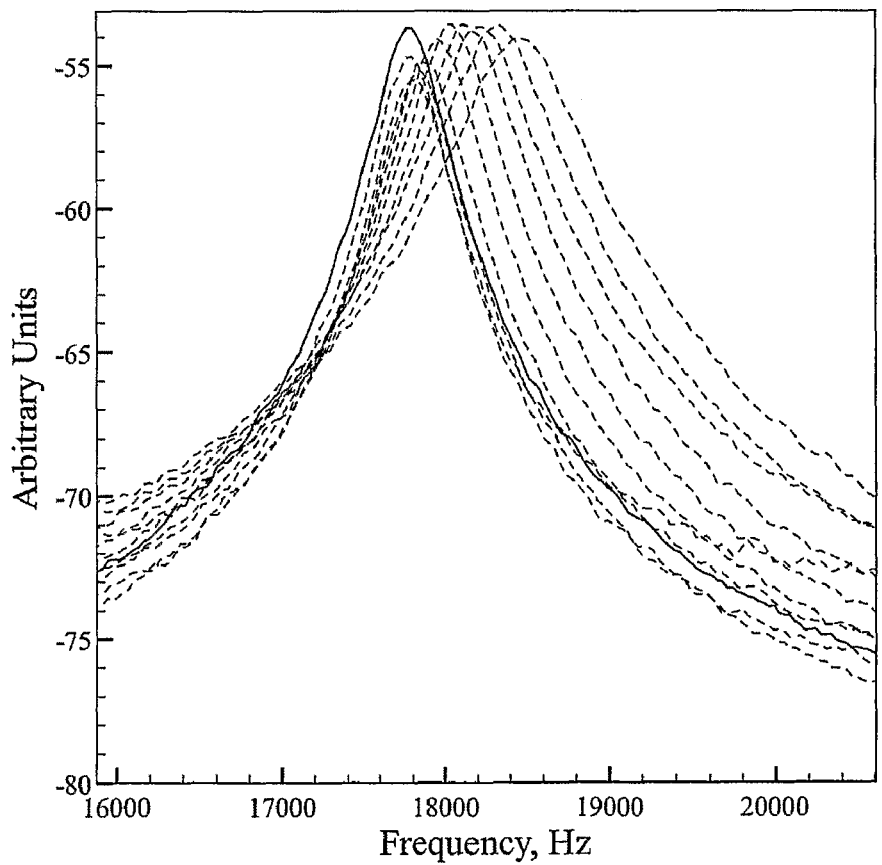
FIG. 4 shows an example of variation of the amplitude of vibration of the cantilever of FIG. 1 on a logarithmic scale against frequency for varying applied fluid pressures.
Figure 5:
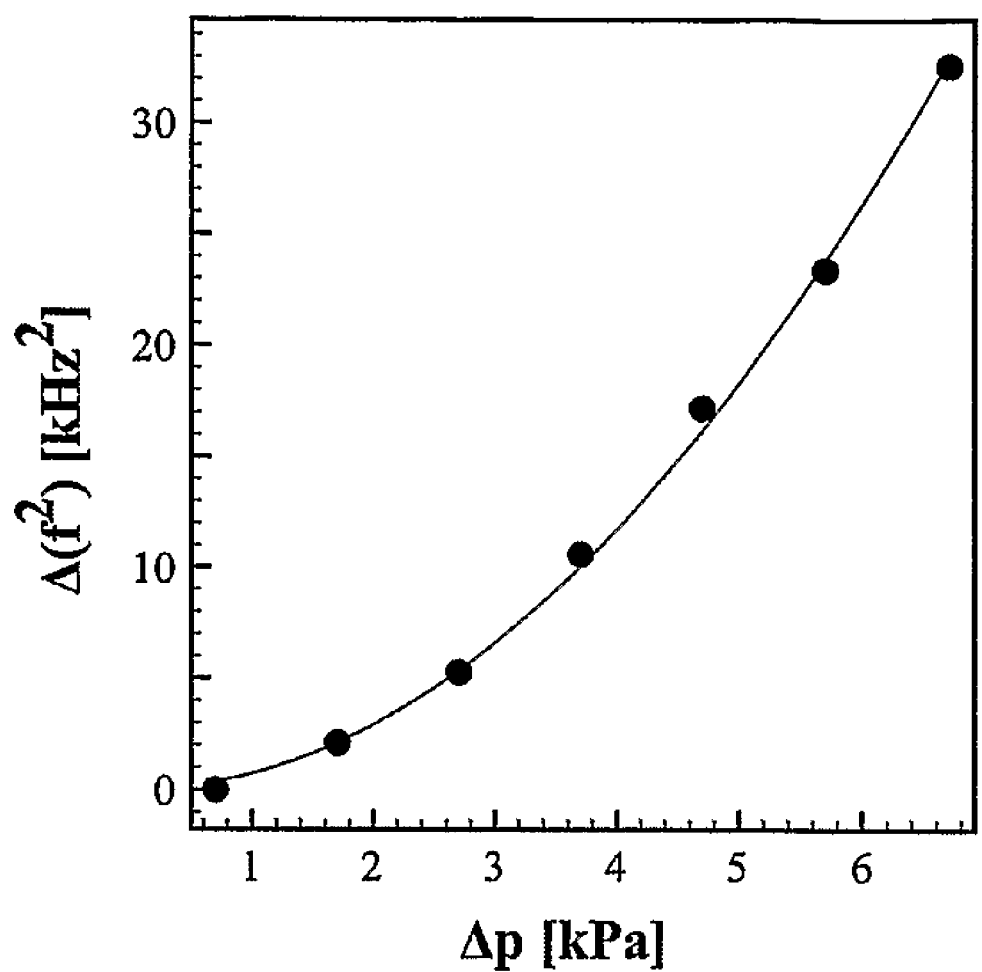
FIG. 5 shows an example of the variation of resonance shifts $\Delta(f^2)$ of the cantilever of FIG. 1 measured as a function of the applied pressure $\Delta p$ together with a best parabolic fit.

Resonance curves obtained using the method and apparatus described above were collected at ten differing fluid pressures/velocities, as shown in FIG. 4. FIG. 5 shows typical resonance shifts $\Delta(f^2)$ measured as a function of the applied pressure $\Delta p$ together with the best parabolic fit. The resonance frequencies of three V-shaped cantilevers made from silicon nitride with nominal spring constants of 0.06, 0.12, and 0.32 N/m (Veeco Instruments Inc., NY, USA), and one tipless rectangular cantilever made from silicon with a nominal spring constant of 0.03 N/m (MikroMasch, Estonia) were measured as a function of pressure difference $\Delta p$. The maximum increase in the resonance frequency of loaded cantilevers ($\Delta p \sim 7$ kPa) in comparison to unloaded ones was found to be ~1.5% for the cantilever with the highest force constant (0.32 N/m) and ~5% for the other cantilevers investigated.

The nominal and experimentally determined values of the resonance frequencies, the surface areas, and the spring constants for all cantilevers investigated are shown in Table 1. Nominal values are those provided by the manufacturers.

TABLE 1

| Cantilever Type | Resonance frequency exp. (nominal), kHz | Surface area exp. (nominal), $10^{-8}$ m$^2$ | Force constant exp. (nominal), N/m |
| --- | --- | --- | --- |
| Tipless silicon (E) (CSC12, MikroMasch, Estonia) | 10.90 (10) | 1.25 (1.22) | 0.031 (0.03) |
| V-shaped silicon nitride (B) (NP Series, Veeco, US) | 20.96 (20) | 1.26 (1.42) | 0.131 (0.12) |
| V-shaped silicon nitride gold-coated (C) (NPG Series, Veeco, US) | 46.52 (56) | 0.32 (0.32) | 0.351 (0.32) |
| V-shaped silicon nitride gold-coated (D) (NPG Series, Veeco, US) | 14.98 (12) | 0.75 (0.74) | 0.062 (0.06) |

Normal spring constant values were obtained with high precision. The values are close to the nominal values with slight deviations. In the case of gold coated cantilevers it is likely that the spring constants are affected by the coatings and the biggest deviation from the nominal values was observed for them.

For the above method, L and h have to be known accurately. An error in h in particular will result in a significant error in the spring constant value. h can be influenced by a bending of the cantilever, for example caused by a coating. It is therefore important to determine a possible bending from an optical side view, which can be easily obtained with an optical microscope. The cantilevers listed above did not exhibit significant bending. L can be easily determined accurately from the plan view dimensions under an optical microscope.

The method shows exceptional stability and repeatability, with an error in the resonance frequency of less than 1%. Usually five measurements are performed for each experimental condition but in situations of good reproducibility this can be reduced to a minimum of two measurements. Hence, in accordance with the present invention, it has been demonstrated that the spring constant for cantilevers can be determined in-situ and with high precision. The invention does not require deflection of the cantilever by a solid object and minimises damage to the cantilever or any coating on it. The method is fast, simple and reliable.

In an alternative embodiment, if the spring constant of the cantilever $k_p$ is known, the above measurement cell and method can be adapted to measure the velocity of fluid flow and thus the flow rate by repeating the above procedure and rearranging (12) to determine the peak fluid velocity $u_0$ as follows:

$$u_o = \sqrt{\frac{hk_p}{A\rho}} \cdot \frac{\sqrt{\Delta(f^2)}}{f_{res,0}} \quad (13)$$

When measuring the velocity of fluid flow rather than determining the spring constant of the cantilever, the device inlet 65 is arranged to accept the fluid flow whose velocity is to be measured. This may be done by locating the measurement device 5 in a fluid flow with the inlet open and facing the oncoming flow, and measuring the cantilever's resonant frequency. This provides a simple, quick and reproducible method for measuring the fluid velocity. Because of the small dimensions possible with the device of the invention, flow measurements can be taken at various points in a flow pattern with minimal disruption to the overall flow. Hence, it is possible to accurately measure micro scale flow velocity as well as bulk flow. Multiple cantilevers 80 or measurement cells 5 may be provided to measure micro scale flow at various sites. It will be further appreciated that this embodiment of the measurement cell and method may be further adapted to provide local anemometry with high precision and up to high speeds.

The above description is made by way of example only and variations will be obvious to a person skilled in the art without departing from the scope of the invention. For example, although the fluid used is advantageously nitrogen gas, other gasses or liquids may be used, such as air, and water. The configuration described above is preferentially adapted such that the fluid flow channel is an elongated cuboid, having the inlet 65 opposite the outlet 70 and having smooth, rigid sides. However, other configurations of channel may be used, preferably those that facilitate developed laminar flow of the fluid. Although the cantilever chip 15 is described as being removable, the cantilever chip 15 may be integral with the holder 10, particularly in the fluid flow velocity measurement embodiment. Furthermore, although in the example described herein, the cantilever 80 used is a v-shaped cantilever, other shapes of cantilever such as rectangular cantilevers may be used.

The invention claimed is:

1. Measurement apparatus having a cantilever and a fluid flow channel, the cantilever being positioned in the fluid flow channel such that it projects in a direction parallel to the direction of fluid flow, wherein the fluid flow channel has a length to height ratio greater than or equal to 0.05 Re, where Re is the Reynolds number of the fluid in the fluid flow channel, and the fluid flow channel is shaped and/or sized to provide laminar flow, the apparatus being arranged to provide a fluid flow, wherein movement of the fluid causes a change in the cantilever resonant frequency.

2. Measurement apparatus as claimed in claim 1, comprising means for measuring the frequency of vibration of the cantilever.

3. Measurement apparatus as claimed in claim 2, wherein the means for measuring the vibration frequency of the cantilever is adapted to measure a resonant frequency of the cantilever.

4. Measurement apparatus as claimed in claim 1, comprising means for measuring applied pressure and/or pressure drop and/or velocity of the fluid.

5. Measurement apparatus as claimed in claim 4, wherein the measurement apparatus is configured to determine a spring constant of the cantilever based on (i) a known or measured applied pressure and/or pressure drop and/or fluid velocity (ii) and at least one measurement of resonant frequency.

6. Measurement apparatus as claimed in claim 1, comprising means for providing fluid flow at a known applied pressure and/or pressure drop and/or fluid velocity.

7. Measurement apparatus as claimed in claim 1, wherein the measurement apparatus is configured to determine the applied pressure and/or pressure drop and/or velocity of the fluid and/or fluid flow rate based on at least one measurement of resonant frequency.

8. Measurement apparatus as claimed in claimed in claim 1, wherein the cantilever is at least partially coated with a bio-film.

9. Measurement apparatus as claimed in claim 1, wherein the cantilever is rectangular or v-shaped.

10. Measurement apparatus as claimed in claim 1, wherein the cantilever extends between 10 and 400 μm perpendicularly from a mount.

11. Measurement apparatus as claimed in claim 1, wherein the walls of the channel are smooth.

12. Measurement apparatus as claimed in claim 1, wherein the channel defines an opening to receive fluid flow and an opening at which the cantilever meets the mount.

13. Measurement apparatus as claimed in claim 12, wherein the length of the channel between the opening to receive fluid flow and the opening at which the cantilever meets the mount is substantially equal to the hydrodynamic entry length.

14. Measurement apparatus as claimed in claim 12, wherein the cantilever is adapted to be removably mounted on a base, with the base adapted to receive the cantilever to form the channel.

15. Measurement apparatus as claimed in claim 1, wherein the cantilever is at least part of a sensing head or cantilever chip for an atomic force microscope.

16. Measurement apparatus as claimed in claim 1, wherein the channel is substantially rigid.

17. Measurement apparatus as claimed in claim 1, comprising a cover for covering the cantilever and channel.

18. Measurement apparatus as claimed in claim 17, wherein the cover is transparent.

19. Measurement apparatus claimed in claim 1, wherein the channel has a fluid inlet and a fluid outlet and the cantilever is positioned so that it projects towards the fluid outlet.

20. A method for determining the spring constant of a cantilever comprising positioning the cantilever in a fluid flow channel such that the cantilever extends parallel with the direction of fluid flow in the channel, causing fluid to flow in the channel, measuring the resonant frequency of the cantilever at one or more velocities of fluid flow and calculating the spring constant of the cantilever using the measured resonant frequency.

21. A method for determining the spring constant of a cantilever as claimed in claim 20, comprising providing the fluid at a known applied pressure and/or pressure drop and/or fluid velocity and/or fluid flow rate.

22. A method for determining the spring constant of a cantilever as claimed in claim 20, comprising measuring applied pressure and/or pressure drop and/or fluid velocity of the fluid and/or fluid flow rate.

23. A method for determining the spring constant of a cantilever as claimed in claim 20, wherein the cantilever is arranged relative to the fluid flow such that the pressure exerted by the fluid on the cantilever is substantially static.

24. A method for determining the spring constant of a cantilever as claimed in claim 20, wherein the length to height ratio of the channel is greater than 20.

25. A method for determining the spring constant of a cantilever as claimed in claim 20, wherein the fluid flow is laminar flow.

26. A method for determining the spring constant of a cantilever as claimed in claim 20, wherein the fluid flow is such that the Reynolds number (Re) is less than 2000 and/or the Knudsen number is less than 0.01.

27. A method for determining the spring constant of a cantilever of an atomic force microscope as claimed in claim 20.

28. A method for determining the velocity of flow of a fluid or fluid flow rate comprising positioning a cantilever in a fluid flow channel so that the cantilever extends parallel with the direction of fluid flow, measuring the resonant frequency of the cantilever and using the measured resonant frequency to determine the velocity of flow of the fluid.

29. A method for determining the velocity of flow of a fluid or fluid flow rate as claimed in claim 28, comprising using a cantilever of known spring constant or determining the spring constant of a cantilever.

30. A holder adapted to receive an atomic force microscope cantilever chip such that the cantilever chip and/or the holder define a channel for fluid flow and wherein the cantilever is mounted at an opening of the fluid flow channel, the cantilever being in communication with and extending parallel to, the channel.

* * * * *